US012779727B2

(12) United States Patent
Nemoto

(10) Patent No.: US 12,779,727 B2
(45) Date of Patent: Nov. 3, 2026

(54) WORKING MACHINE

(71) Applicant: Koki Holdings Co., Ltd., Tokyo (JP)

(72) Inventor: Daisuke Nemoto, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 300 days.

(21) Appl. No.: 18/443,391

(22) Filed: Feb. 16, 2024

(65) Prior Publication Data

US 2024/0278450 A1 Aug. 22, 2024

(30) Foreign Application Priority Data

Feb. 16, 2023 (JP) ................................ 2023-022589

(51) Int. Cl.
*B27B 19/00* (2006.01)
*B23D 51/10* (2006.01)

(52) U.S. Cl.
CPC ............ *B27B 19/006* (2013.01); *B23D 51/10* (2013.01)

(58) Field of Classification Search
None
See application file for complete search history.

(56) References Cited

U.S. PATENT DOCUMENTS 10,906,153 B2 * 2/2021 Aoki ......................... B25F 3/00
11,052,475 B2 * 7/2021 Li ......................... B23D 61/006
12,134,177 B2 * 11/2024 Li ......................... B24B 23/04
2012/0139196 A1 * 6/2012 Zhou ..................... B24B 23/022 279/140
2012/0211951 A1 * 8/2012 Montplaisir ............ B24B 23/04 279/141
2013/0180747 A1 * 7/2013 Brown .................... B24B 23/04 173/145
2014/0327215 A1 11/2014 Thorson et al.
2015/0183107 A1 7/2015 Ito et al.
2019/0022816 A1 * 1/2019 Kuehne ..................... B27B 5/32
(Continued)

FOREIGN PATENT DOCUMENTS

DE 102012004458 A1 * 9/2013 ........... B27B 19/006
DE 102019131292 A1 * 5/2021 ................ B25F 5/00
JP 2015-127075 A 7/2015

OTHER PUBLICATIONS

English translation of DE-102019131292-A1, dated May 20, 2021.*
(Continued)

*Primary Examiner* — Hwei-Siu C Payer
(74) *Attorney, Agent, or Firm* — Rimon P.C.

(57) ABSTRACT

An electric-powered tool includes a motor, a unit case, an attachment ring, a clamp shaft, a clamp spring, a tool shaft, and a clamp lever. A term "A" (N) represents a spring load of the clamp spring provided when the clamp lever is located at a first position. A term "B" (mm) represents a lever length from a center position of a support shaft to a position of the clamp lever in a front-rear direction. A term "C" (degree) represents a turning angle from the first position to the second position of the clamp lever. A term "D" (mm) represents a movement amount of the clamp shaft provided when the clamp lever is rotated from the first position to the second position. When a relation of "a characteristic value Q=(A×D)/(B×C)×100" is established, the characteristic value "Q" is equal to or smaller than 50 (N/degree).

15 Claims, 14 Drawing Sheets

(56) References Cited

U.S. PATENT DOCUMENTS

2024/0278450 A1* 8/2024 Nemoto ................. B23D 51/10

OTHER PUBLICATIONS

First Office Action dated Jan. 20, 2026, issued in corresponding Japanese Application No. 2023-022589.
Second Office Action dated May 19, 2026, issued in corresponding Japanese Application No. 2023-022589.
Amendment and Remarks in response to the First Office Action submitted on Mar. 23, 2026, in corresponding Japanese Application No. 2023-022589.

* cited by examiner

FIG. 11

| ITEM | A SPRING LOAD | B LEVER LENGTH | C LEVER OPERATION ANGLE | D STROKE | E DISTANCE BETWEEN AXIS-CENTER END SURFACES | F CAM CIRCULAR ARC LENGTH | G RADIUS OF CURVATURE OF CAM | H AMPLITUDE | I ROTATION SPEED WITHOUT LOAD | J MACHINE TOTAL LENGTH | K MACHINE WEIGHT | OPERATION LOAD RATIO $Q=\frac{A\times D}{B\times C}\times 100$ | OPERATION LOAD F (PRACTICAL MEASUREMENT) |
|---|---|---|---|---|---|---|---|---|---|---|---|---|---|
| UNIT | (N) | (mm) | (DEGREE) | (mm) | (mm) | (mm) | (mm) | (DEGREE) | $(min^{-1})$ | (mm) | (kg) | (N/DEGREE) | (N) |
| M1 | 289 | 68 | 110 | 5 | 4.3 | 11.8 | R5 | 3.6 | 20000 | 338 | 2 | 19.3 | 30 |
| M2 | 1837 | 70 | 90 | 3 | 5.3 | 19.8 | R7.5 | 3.2 | 20000 | 307 | 2 | 87.5 | 110 |
| M3 | 1580 | 50 | 80 | 2.4 | 6.2 | 11.2 | R6.5 | 4.2 | 20000 | 367 | 1.9 | 94.8 | 95 |
| M4 | 1990 | 70 | 135 | 3.2 | 5.1 | 19 | R8.5 | 3.2 | 20000 | 340 | 2.2 | 67.4 | 77 |
| M5 | 1417 | 65 | 135 | 3.9 | 5.3 | 21.6 | R8 | 3.2 | 20000 | 364 | 2 | 63.0 | 83 |
| M6 | 300 | 65 | 60 | 5.5 | — | — | — | — | — | — | — | 42.3 | 47 |
| M7 | 289 | 60 | 135 | 5.5 | — | — | — | — | — | — | — | 19.6 | 14 |
| M8 | 788 | 68 | 90 | 3.2 | — | — | — | — | — | — | — | 41.2 | 67 |
| M9 | 295 | 70 | 120 | 5.5 | — | — | — | — | — | — | — | 19.3 | 26 |

WORKING MACHINE

CROSS-REFERENCE TO RELATED APPLICATION

The present application claims priority from Japanese Patent Application No. 2023-22589 filed on Feb. 16, 2023, the content of which is hereby incorporated by reference into this application.

TECHNICAL FIELD OF THE INVENTION

The present invention relates to a working machine that operates by driving a motor.

BACKGROUND OF THE INVENTION

An electric-powered working machine described in Patent Document 1 (Japanese Patent Application Laid-Open Publication No. 2015-127075) includes: a lever to be operated by an operator; a tool fixing member that can fix and release a tip tool to and from an output shaft; and a compression coil spring made of a metal. When the lever is operated, the tool fixing member is switched from a fixed state to a released state.

SUMMARY OF THE INVENTION

In a configuration including a spring and a lever and capable of attaching/detaching a tip tool by operating the lever as similar to a configuration of the Patent Document 1, the spring needs to be compressed when the tip tool is removed, and an operation load required to operate the lever tends to increase. Accordingly, there is room for improvement in terms of operability.

An object of the present invention is to provide a working machine having improved operability.

A working machine according to one embodiment includes: a motor; an output part swinging around an axis extending along an up-down direction when receiving a rotational force of the motor; a tool holding part being provided in the output part and being capable of holding a tip tool; a clamp shaft being supported by the output part; an urging member urging the clamp shaft upward; a clamp part being attachable/detachable to/from a lower portion of the clamp shaft and urging the tip tool from below when being attached to the clamp shaft; and a lever being capable of rotating around a support shaft and being capable of moving the clamp shaft in the up-down direction when being rotated between a first position and a second position in a rotational direction. The tool holding part and the clamp part fix the tip tool to the output part when sandwiching the tip tool therebetween. The lever moves the clamp shaft downward relative to the output part to separate the tool holding part and the clamp part from each other in the up-down direction when being rotated from the first position to the second position. A characteristic value "Q" is equal to or smaller than 50 (N/degree) when a relation of "the characteristic value Q=(A×D)/(B×C)×100" is established, where a term "A" (N) represents an urging force of the urging member provided when the lever is located at the first position, a term "B" (mm) represents a lever length from a center position of the support shaft to a tip position of the lever in an intersection direction intersecting the up-down direction, a term "C" (degree) represents a turning angle from the first position to the second position of the lever, and a term "D" (mm) represents a movement amount of the clamp shaft provided when the lever is rotated from the first position to the second position.

According to the present invention, operability of a working machine can be improved.

BRIEF DESCRIPTIONS OF THE DRAWINGS

FIG. 11 is a table illustrating respective values of parameters relating to the electric-powered tool, an operation load rate, and an operation load.

DESCRIPTIONS OF THE PREFERRED EMBODIMENTS

An embodiment of the present invention will hereinafter be described with reference to the drawings. In each of the drawings, description is made by taking a direction indicated by forward and rearward arrows as a front-rear direction, a direction indicated by leftward and rightward arrows as a left-right direction, and a direction indicated by upward and downward arrows as an up-down direction. The front-rear direction, the left-right direction, and the up-down direction are perpendicular to one another. The front-rear direction is an example of an intersection direction intersecting the up-down direction. The left-right direction is an example of a width direction intersecting both the up-down direction and the intersection direction. Each of the front-rear direction and the left-right direction, is for example, a horizontal direction.

Configuration of Electric-Powered Tool

Figure 1:
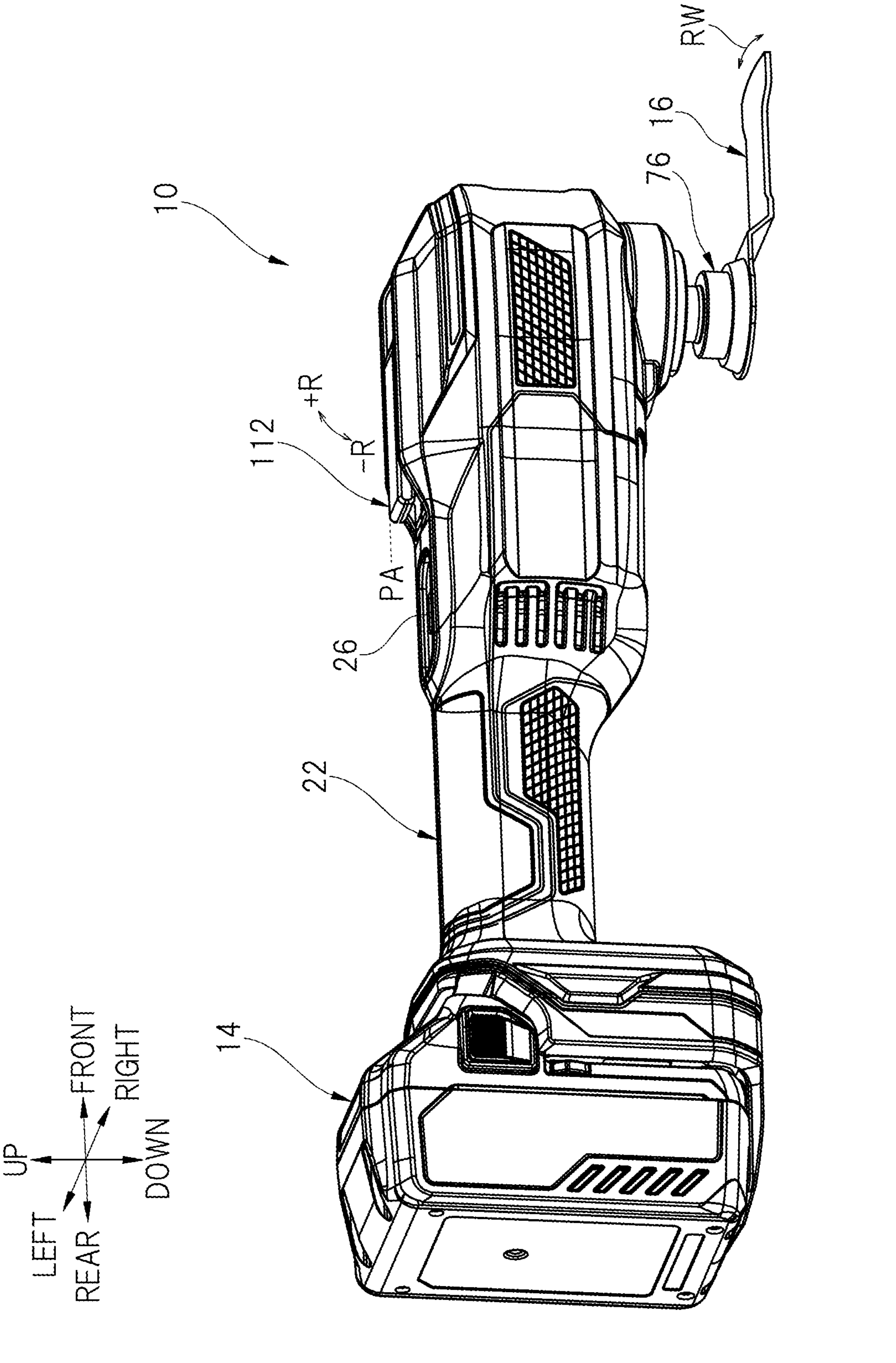
FIG. 1 is a perspective view illustrating an electric-powered tool according to an example of a working machine.

FIG. 1 illustrates an electric-powered tool 10 as an example of a working machine. The electric-powered tool 10 includes an outer housing 22 and a battery pack 14, and is configured to be able to replace a tip tool 16 with another tip tool. The electric-powered tool 10 is a multi-tool of a cordless type to be operated by electric power of the battery pack 14. The electric-powered tool 10 oscillates the tip tool 16 in a direction, for example, indicated by an arrow RW. The outer housing 22 forms an outer shell of the electric-powered tool 10. The battery pack 14 can be attached/detached to/from a rear end portion of the outer housing 22.

<Tip Tool>

Figure 2:
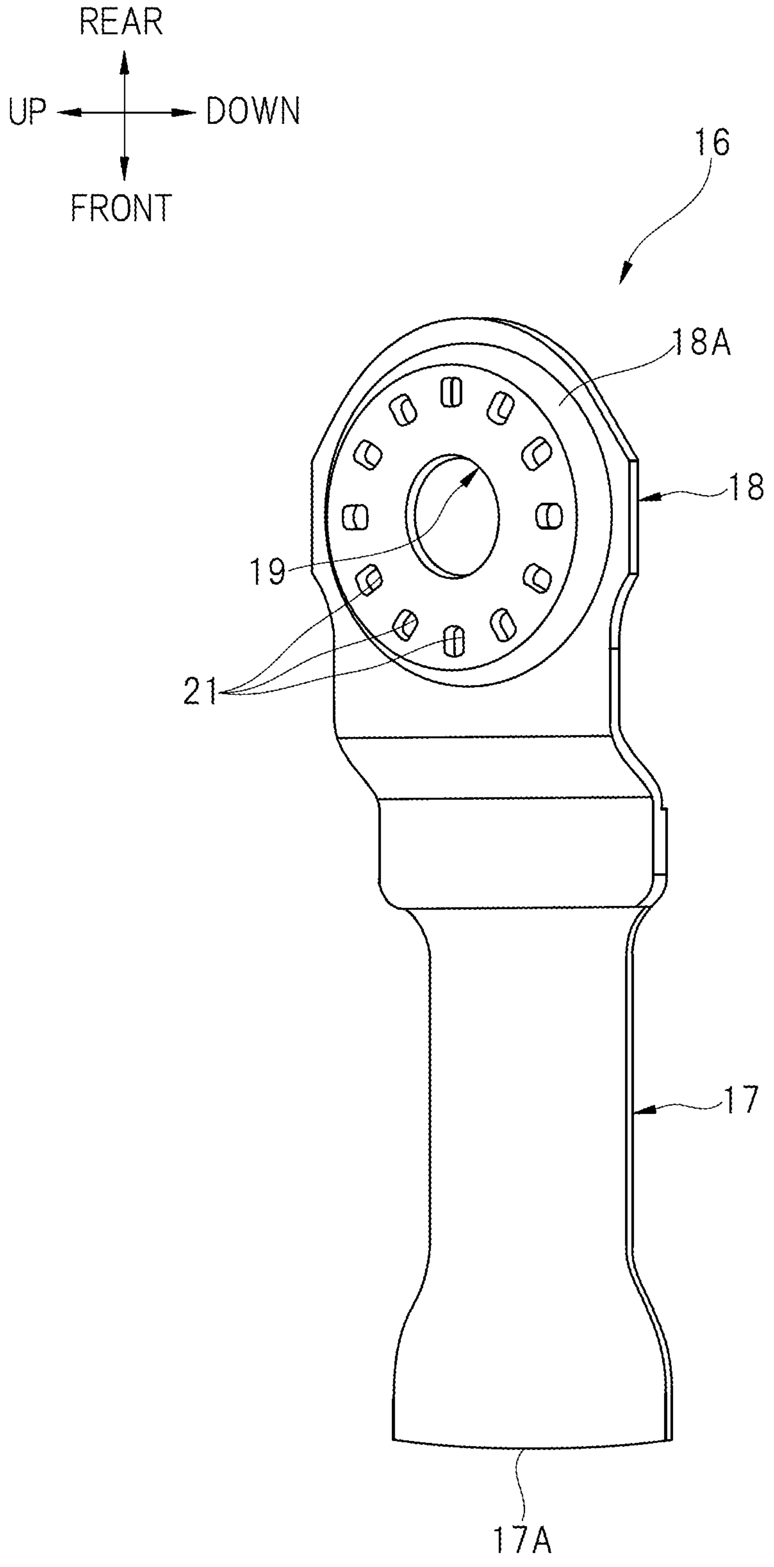
FIG. 2 is a perspective view of a tip tool.

As illustrated in FIG. 2, the tip tool 16 has a shape of a plate having a predetermined thickness in the up-down direction, the plate being bent at a plurality of portions. The tip tool 16 extends along the front-rear direction, and includes a flat plate part 17 on its front side and an attachment part 18 on its rear side. A blade part 17A is formed at a front end of the flat plate part 17.

The attachment part 18 is located obliquely above the flat plate part 17. One hole part 19 and a plurality of through holes 21 are formed in the attachment part 18. The hole part 19 is formed in a central portion of the attachment part 18. The plurality of through holes 21 are located outside the hole part 19, and surrounds the hole part 19. Some of the plurality of through holes 21 are an example of a plurality of hole parts arranged in a swing direction of a unit case 68. The hole part 19 has a size in which a shaft body 106 of a tool shaft 102 (FIG. 8) described later can be inserted thereinto. Protrusions 79 (FIG. 6) described later are respectively inserted into the plurality of through holes 21. Note that a lower end surface of the attachment part 18 is set as a lower surface 18A.

<Outer Housing>

Figure 3:
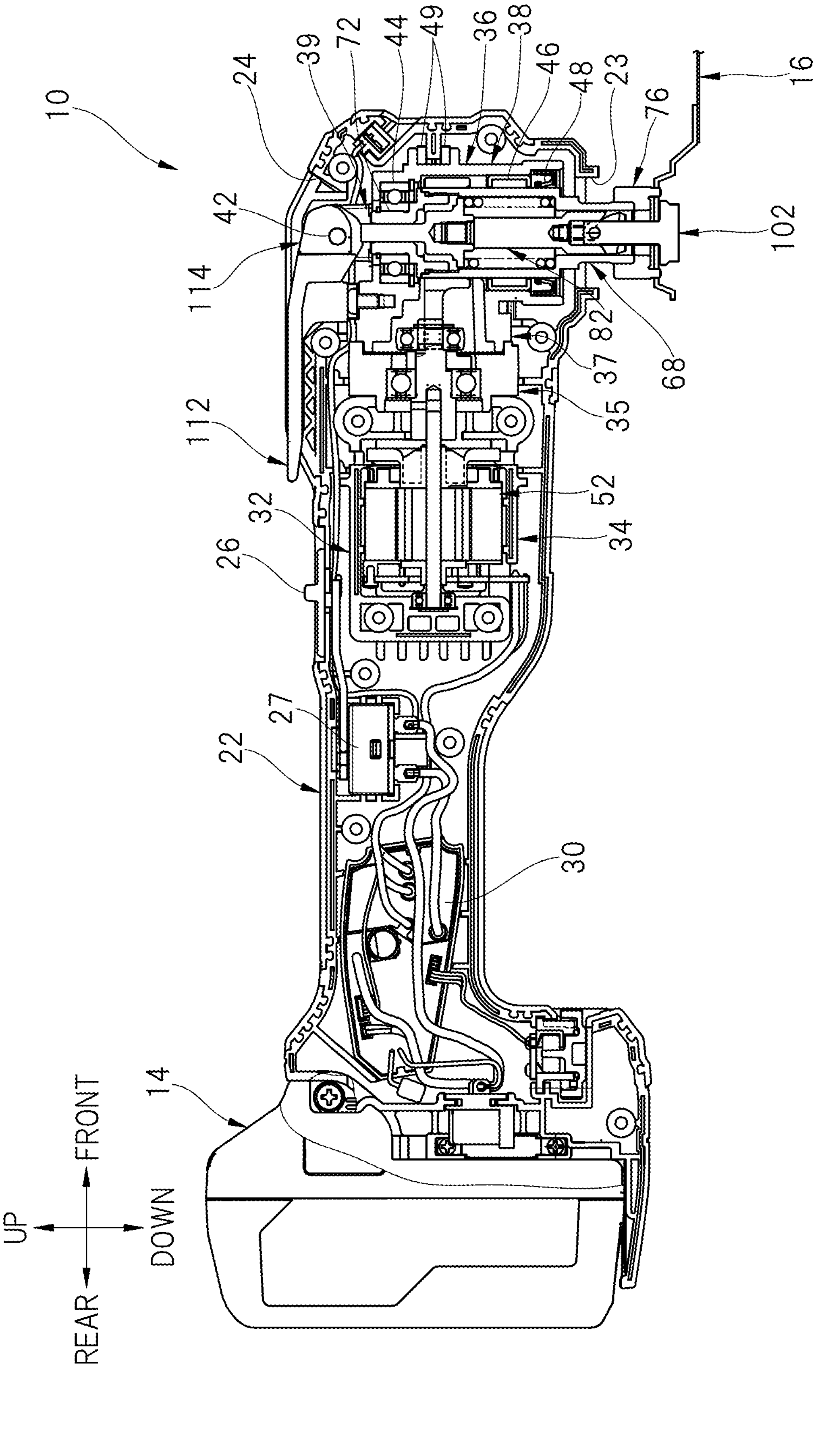
FIG. 3 is a cross-sectional view illustrating an internal structure of the electric-powered tool.

FIG. 3 illustrates an internal structure of the electric-powered tool 10. The outer housing 22 is, for example, a resin molded body. The outer housing 22 is formed in a cylindrical shape having a center axis extending along the front-rear direction. A lower opening 23 is formed in a lower end portion on the front side of the outer housing 22. An upper opening 24 is formed in an upper end portion on the front side of the outer housing 22.

An upper portion of the outer housing 22A is provided with a clamp lever 112 and a trigger 26 described later. A switch 27, a control board 30, an inner housing 32, a motor 52, and the like are housed in the outer housing 22.

The trigger 26 is connected to the switch 27. When the trigger 26 is operated by the operator, on and off of the switch 27 are switched. A controller, a switching element and the like that control driving of the motor 52 are mounted on the control board 30. Driving and stop of the motor 52 are switched to match on and off of the switch 27.

<Inner Housing>

The inner housing 32 is formed in a bottomed cylindrical shape, the front of which is opened. The inner housing 32 is located to be spaced apart from an inner surface of the outer housing 22. The inner housing 32 includes, for example, a motor case 34, a bearing holder 35, and a head case 36. A rear end portion of the bearing holder 35 is attached to the motor case 34. The motor 52 is housed inside the motor case 34.

The head case 36 is a member made of a metal such as aluminum. The head case 36 includes an attachment part 37, a cylindrical part 38, and a support wall 39. A front end portion of the bearing holder 35 is attached to the attachment part 37. The cylindrical part 38 is positionally closer to the front side than the attachment part 37. The cylindrical part 38 is formed in a cylindrical shape having a center axis extending along the up-down direction.

The support wall 39 is provided in an upper end portion of the cylindrical part 38. The support wall 39 supports both end portions in an axial direction of a columnar support shaft 42. The axial direction of the support shaft 42 extends along, for example, the left-right direction. Note that the support shaft 42 is an example of a support shaft. Ball bearings 44 and 46, an oil seal 48, and a unit case 68 described later are provided inside the cylindrical part 38.

The ball bearing 44 is positionally closer to the front side and the upper side than a swing arm 62 described later. Each of the ball bearings 44 and 46 has a center axis extending along the up-down direction. The ball bearing 44 rotatably supports a guide part 72 described later around its center axis. The ball bearing 46 is positionally closer to the front side and the lower side than the swing arm 62, and rotatably supports a housing part 69 described later. The oil seal 48 closes a gap between a lower portion of the head case 36 and a lower portion of the housing part 69.

The outer housing 22 supports the head case 36 through a rubber member 49. The rubber member 49 is formed in a C shape as viewed in the up-down direction. The rubber member 49 prevents oscillation from propagating from the head case 36 to the outer housing 22 when the motor 52 operates.

Figure 4:
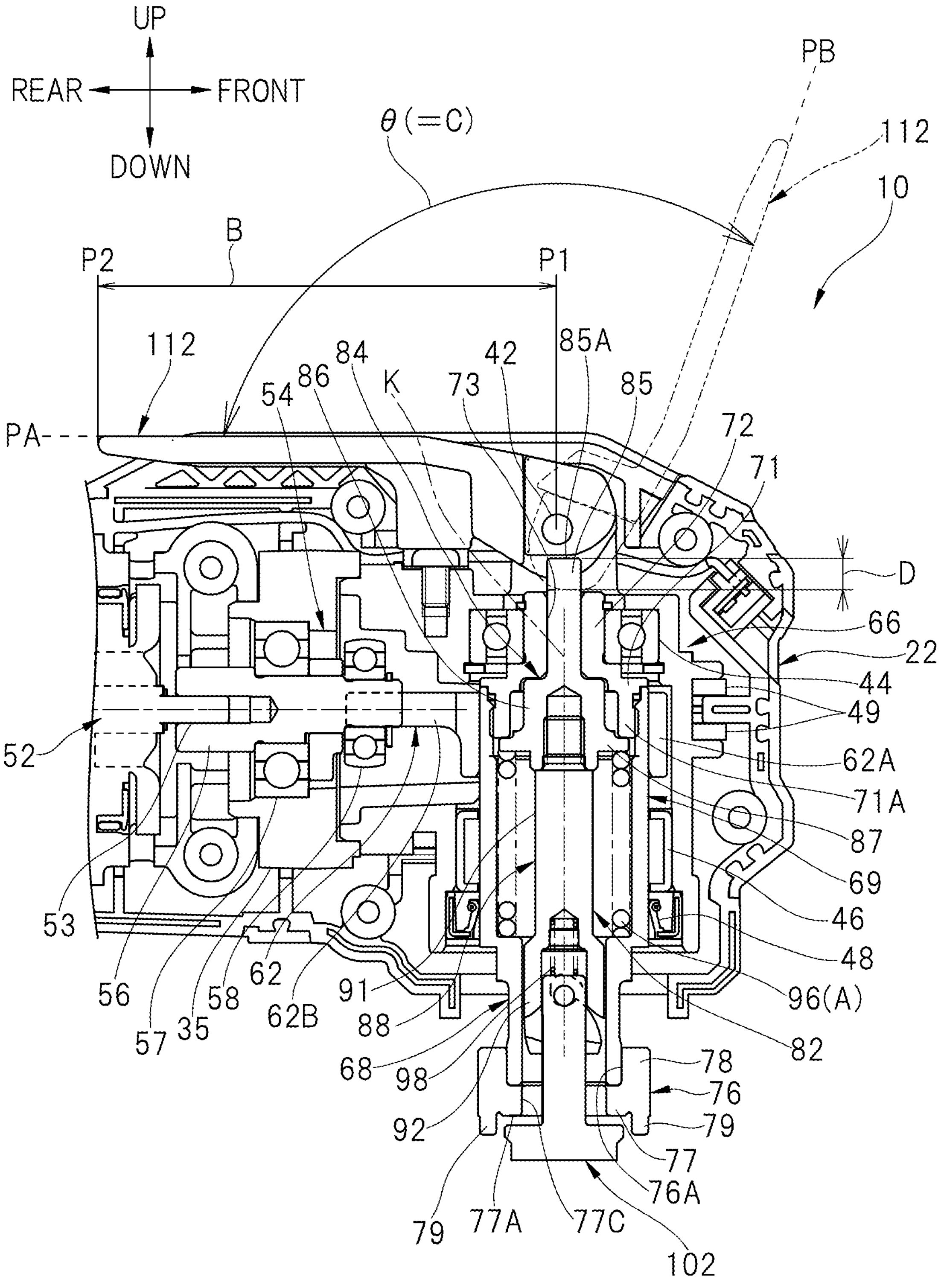
FIG. 4 is an enlarged cross-sectional view illustrating an internal structure in a front portion of the electric-powered tool.

As illustrated in FIG. 4, the electric-powered tool 10 includes a motor 52, a transmission mechanism part 54, and a driving mechanism part 66.

<Motor>

The motor 52 is located in a central portion of the outer housing 22, the central portion being in the front-rear direction. The motor 52 is a brushless motor. The motor 52 includes a rotation shaft 53. The rotation shaft 53 extends along the front-rear direction. The motor 52 can be driven by supply of electric power from the battery pack 14 (FIG. 1).

<Transmission Mechanism Part>

The transmission mechanism part 54 includes a spindle 56, a ball bearing 57, an eccentric shaft part 58, and the swing arm 62.

(Spindle and Others)

The spindle 56 is attached to a front portion of the rotation shaft 53 in the motor 52. The spindle 56 extend along the front-rear direction, and rotates together with the rotation shaft 53. The ball bearing 57 is supported by the bearing holder 35. The ball bearing 57 rotatably supports a central portion of the spindle 56, the central portion being in the front-rear direction. A front end of the spindle 56 is provided with the eccentric shaft part 58. A center axis of the eccentric shaft part 58 is in parallel to a center axis of the spindle 56 and is located at a position that shifts from the center axis of the spindle 56.

(Swing Arm)

The swing arm 62 includes an annular attachment part 62A and a U-shaped arm part 62B extending rearward from the attachment part 62A, as viewed in the up-down direction. The attachment part 62A is fixed to an outer peripheral surface of the unit case 68 described later. The arm part 62B sandwiches an outer peripheral portion of the eccentric shaft part 58. That is, the swing arm 62 makes cooperation between a rotational operation of the eccentric shaft part 58 and an operation of the unit case 68. Specifically, the arm part 62B is swung in the left-right direction by the rotation of the eccentric shaft part 58. In this manner, the driving mechanism part 66 described later can oscillate in a rotational direction centered around its own axis.

<Driving Mechanism Part>

The driving mechanism part 66 includes the unit case 68, an attachment ring 76, a clamp shaft 82, a clamp spring 96, a tool shaft 102, and a clamp lever 112. The driving mechanism part 66 is configured so that the clamp shaft 82 can swing around an axis K extending along the up-down direction by transmission of a rotational force (driving force) from the motor 52 through the transmission mechanism part 54.

(Unit Case)

The unit case 68 includes the housing part 69, an upper wall part 71, and a guide part 72. The unit case 68 is an example of the output part. The unit case 68 swings around the axis K when receiving the rotational force from the motor 52.

The housing part 69 is a cylindrical-shape section, an axial direction of which is the up-down direction. The swing arm 62 is fixed to the housing part 69. An outer peripheral portion of the housing part 69 is in contact with an inner ring portion of the ball bearing 44 and the oil seal 48. A clamp shaft 82 and a clamp spring 96 described later are housed in the housing part 69. The upper wall part 71 covers an upper end portion of the housing part 69. A vertical wall 71A extending downward is formed in the upper wall part 71. The vertical wall 71A is formed in an annular shape as viewed in the up-down direction.

The guide part 72 extends upward from the upper wall part 71. The guide part 72 is a cylindrical section having a center axis extending along the up-down direction. By the ball bearing 44, the guide part 72 is supported to be rotatable (swingable) around the axis K. A through hole 73 extending along the up-down direction is formed in the upper wall part 71 and the guide part 72.

(Attachment Ring)

A lower end portion of the unit case 68 is provided with the attachment ring 76. The attachment ring 76 is an example of a tool holding part that can hold the tip tool (FIG. 1).

The attachment ring 76 includes a bottom wall 77, a side wall 78, and the plurality of protrusions 79. The bottom wall 77 is formed in a circular disk shape having a predetermined thickness in the up-down direction. A bottom surface 77A is formed at a lower end of the bottom wall 77. A plurality of recessed parts 77B (FIG. 6) are formed in an outer peripheral portion of the bottom surface 77A. The plurality of recessed parts 77B are arranged to be spaced apart from one another in a circumferential direction of the bottom surface 77A, and are recessed upward. A hole part 77C that penetrates the bottom wall 77 in the up-down direction is formed in a central portion of a circle of the bottom wall 77. The hole part 77C is an example of an insertion hole into which the shaft body 106 is inserted.

The side wall 78 stands straight upward from an outer peripheral portion of the bottom wall 77, and is formed in a cylindrical shape. A fitted part 76A is made of the bottom wall 77 and the side wall 78. The lower end portion of the unit case 68 is fitted in the fitted part 76A.

Figure 5:
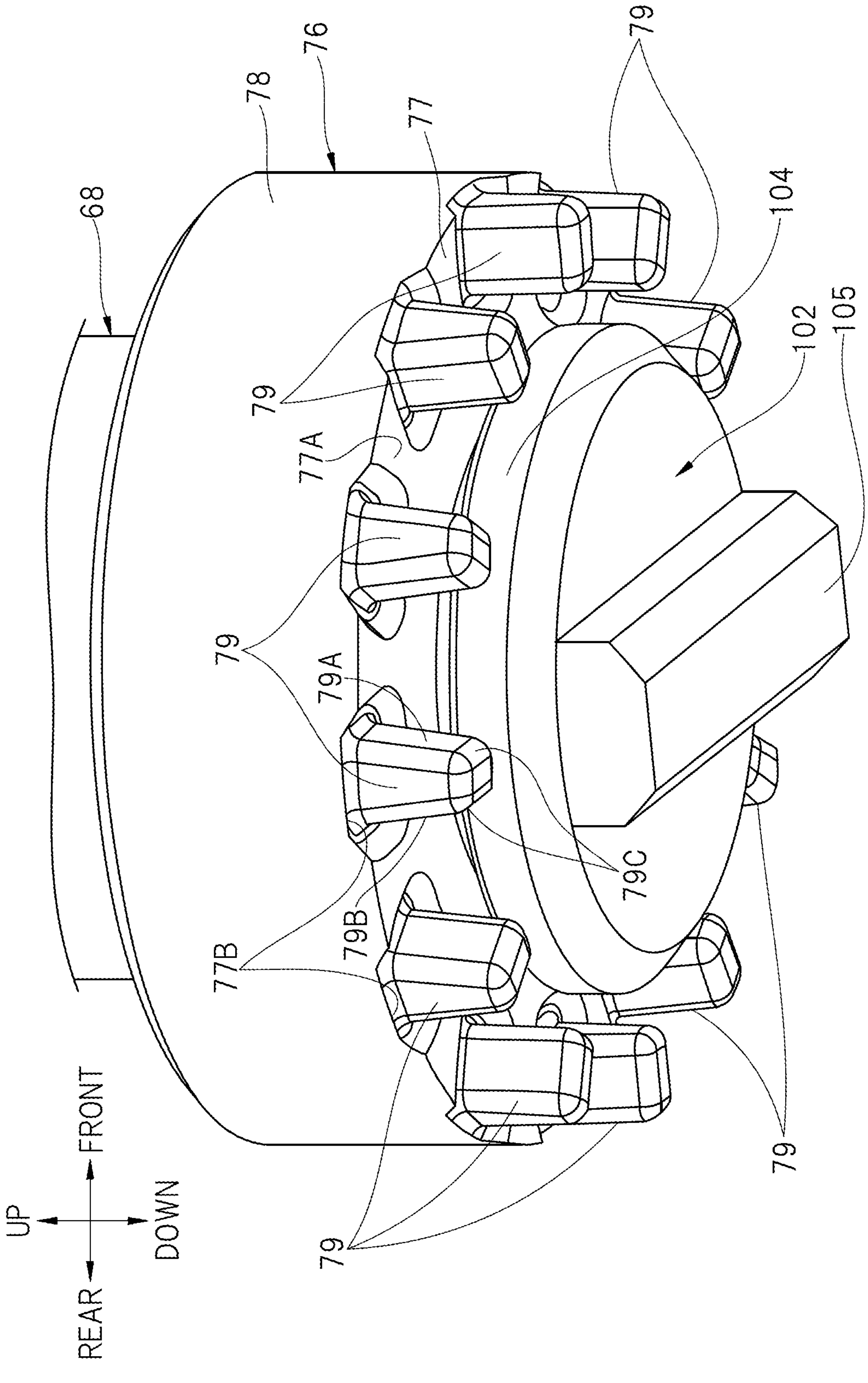
FIG. 5 is a perspective view illustrating an attachment ring and a tool shaft included in the working machine.

As illustrated in FIG. 5, the plurality of protrusions 79 protrude downward from the plurality of recessed parts 77B. In other words, the plurality of protrusions 79 protrude downward from the attachment ring 76. Each of the protrusions 79 is formed in an inverted trapezoidal shape when viewed in a radial direction of the bottom wall 77. Specifically, the protrusion 79 has a tapered surface 79A located on one side in its circumferential direction and a tapered surface 79B located on the other side in the same direction. An "R" part 79C is formed in a lower end portion of the protrusion 79.

The protrusion 79 has a size sufficient to be insertable into the through hole 21 of the tip tool 16 and contactable with a hole wall of the through hole 21. The plurality of protrusions 79 are located to surround the hole part 77C when viewed from below in the up-down direction. The plurality of protrusions 79 can engage (contact) with the plurality of through holes 21 (FIG. 2) at the time of the attachment of the tip tool 16.

Figure 6:
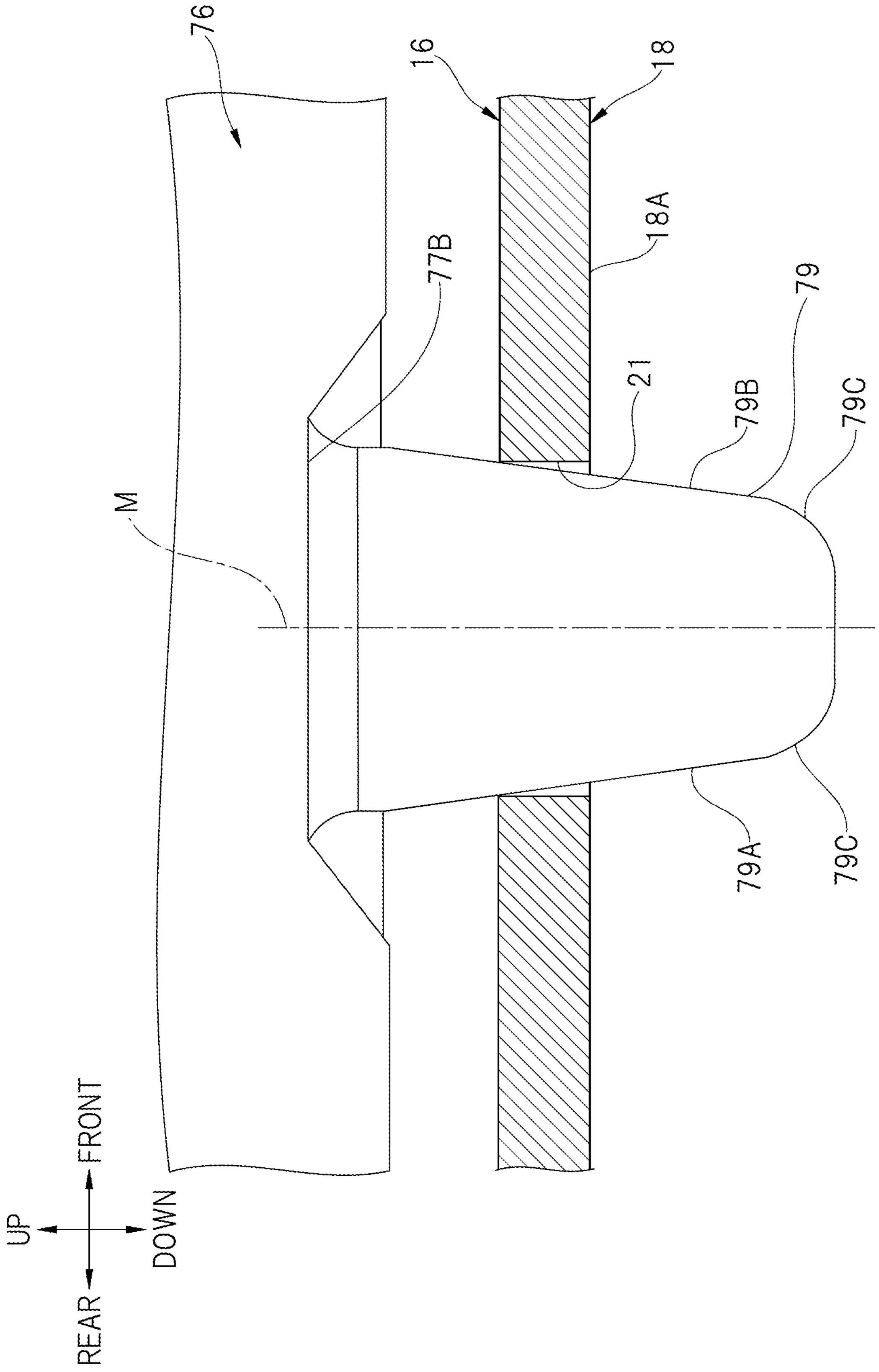
FIG. 6 is an explanatory diagram illustrating a state where a protrusion of the attachment ring is inserted into a through hole of the tip tool.

As illustrated in FIG. 6, a virtual line passing through the center in a swing direction of the protrusion 79 and extending along the up-down direction is assumed to be a reference line M. The swing direction is a direction, for example, indicated by the arrow RW illustrated in FIG. 1. The tapered surface 79A and the tapered surface 79B are in contact with two portions of a hole wall of the through hole 21, the two portions being symmetric to each other across the reference line M. In this manner, each of the tapered surface 79A and the tapered surface 79B is an example of a tapered part in contact with the hole wall of the through hole 21 at least at two portions of the through hole 21.

<Clamp Shaft>

As illustrated in FIG. 4, the clamp shaft 82 is supported by the unit case 68. The clamp shaft 82 is made of an upper shaft part 84 and a lower shaft part 88 that are arranged in the up-down direction. An upper end portion of the lower shaft part 88 is coupled to a lower end portion of the upper shaft part 84. As a result, the upper shaft part 84 and the lower shaft part 88 are unified with each other.

The upper shaft part 84 includes a columnar part 85, a cylindrical part 86, and a flange part 87. The columnar part 85 extends along the up-down direction. An upper portion of the columnar part 85 protrudes more upward than the guide part 72 through the through hole 73. An upper end surface 85A of the columnar part 85 is a plane spreading along the front-rear direction and the left-right direction. The upper end surface 85A faces a push-piece 114 described later in the up-down direction, and is in contact with the push-piece 114 in accordance with the rotation of the clamp lever 112.

The cylindrical part 86 is positionally lower than the columnar part 85, and is unified with the columnar part 85. The cylindrical part 86 has a center axis extending along the up-down direction. The flange part 87 protrudes outward in a radial direction from a lower end portion of the cylindrical part 86. The flange part 87 is made in contact with a lower end portion of the vertical wall 71A when being urged by the clamp spring 96 described later.

The lower shaft part 88 includes a columnar part 91 and a cylindrical part 92. The columnar part 91 extends along the up-down direction. An upper portion of the columnar part 91 is inserted into and fixed to the cylindrical part 86. The cylindrical part 92 is positionally lower than the columnar part 91, and is unified with the columnar part 91. A spring 98 is inserted into the cylindrical part 92.

Figure 7:
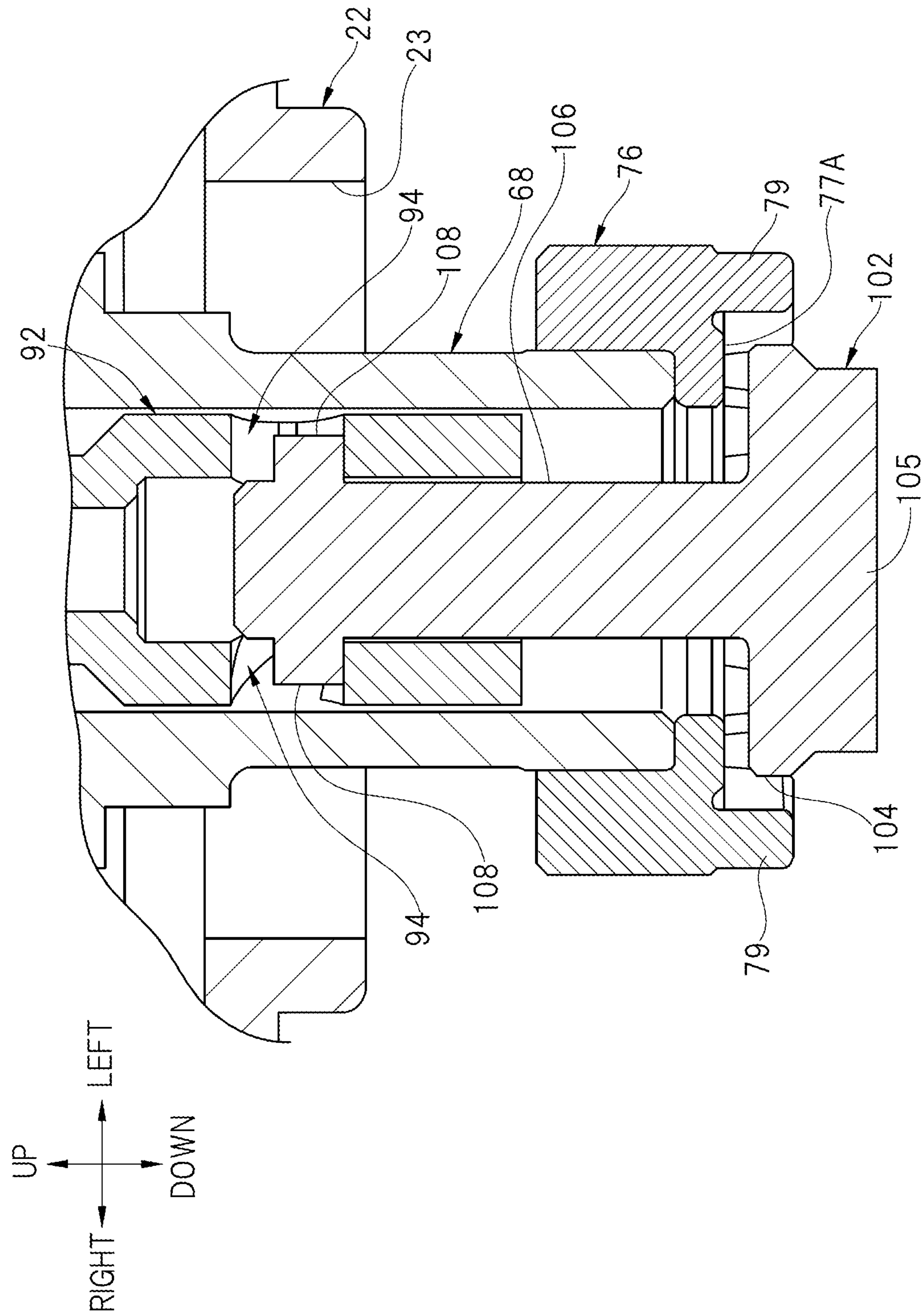
FIG. 7 is an enlarged cross-sectional view illustrating a portion where the tool shaft is attached to a clamp shaft.

As illustrated in FIGS. 6 and 7, the cylindrical part 92 is formed in a cylindrical shape. Two guide hole parts 94 are formed in the cylindrical part 92. Note that the two guide hole parts 94 are located to have a point symmetrical relationship across the center of the cylindrical part 92. Accordingly, the one guide hole part 94 will be described while description of the other guide hole part 94 will be omitted.

Figure 8:
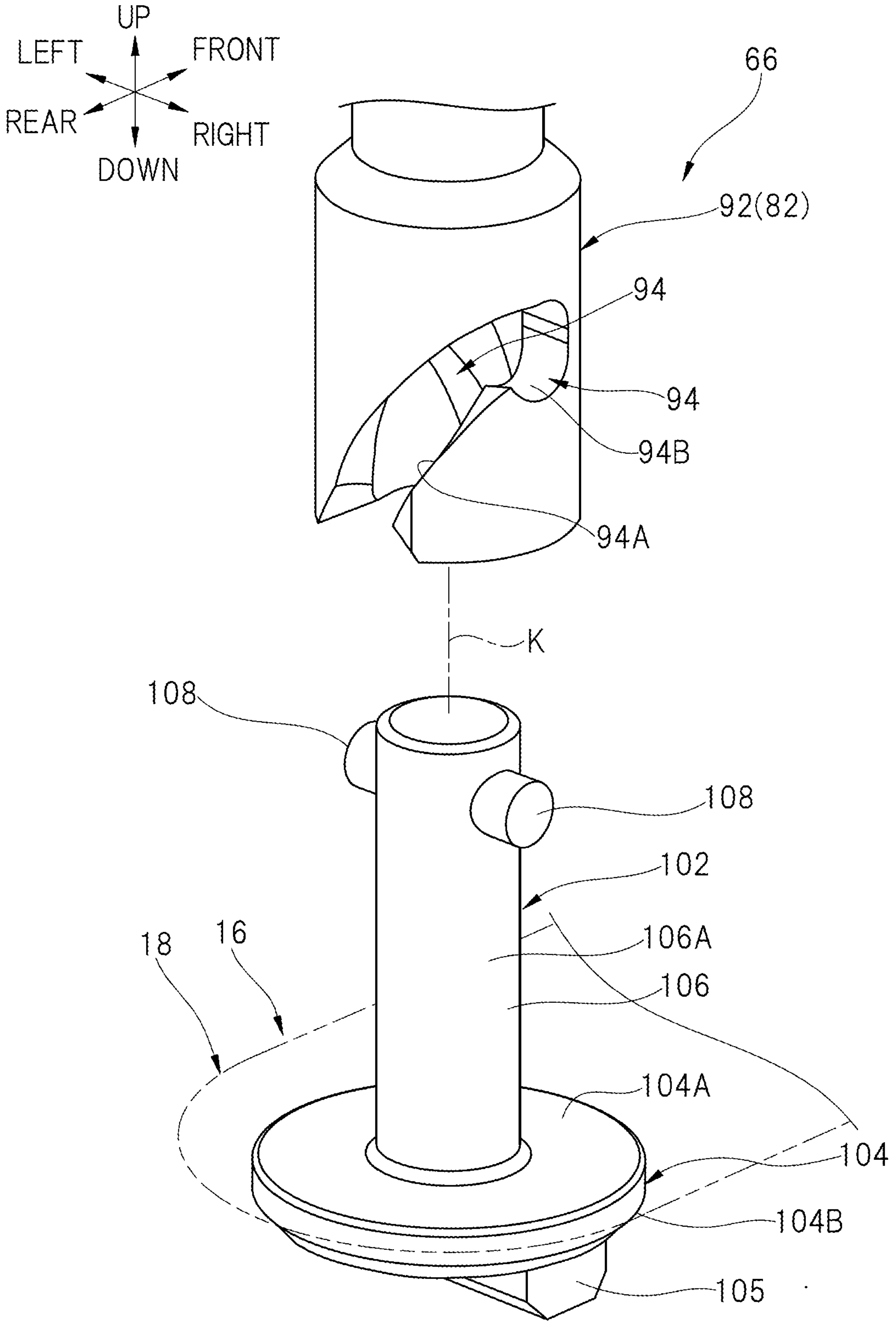
FIG. 8 is a perspective view illustrating a state where the tool shaft is attached to the clamp shaft.
Figure 9:
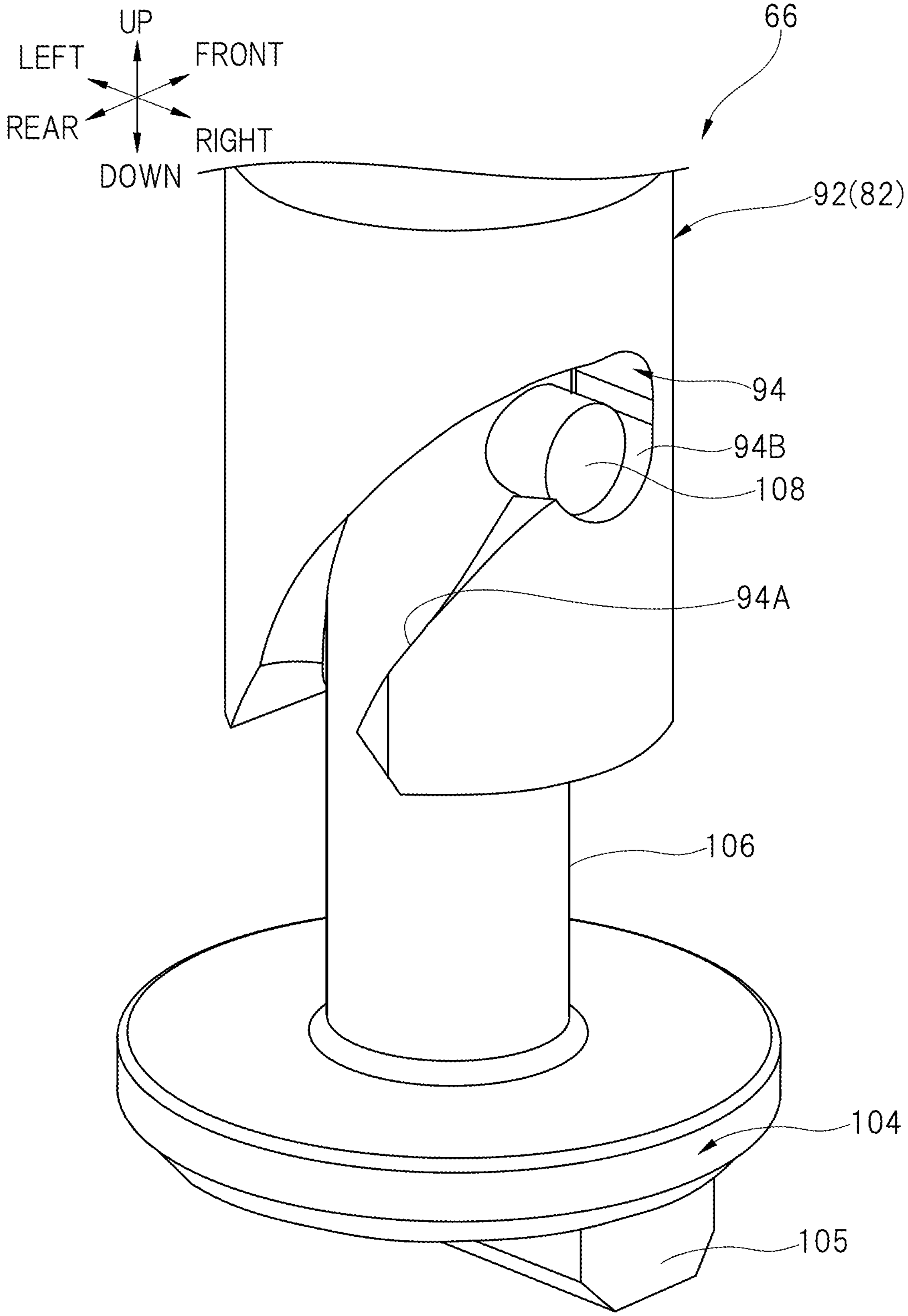
FIG. 9 is a perspective view illustrating the portion where the tool shaft is attached to the clamp shaft.

As illustrated in FIGS. 7 and 8, the guide hole part 94 includes a cam hole 94A formed in a circular arc shape (spiral shape) and a support hole 94B enlarged at a terminal end of the cam hole 94A. The cam hole 94A guides a pin 108 described later toward the support hole 94B. A hole wall of the support hole 94B supports the pin 108.

<Clamp Spring>

As illustrated in FIG. 4, the clamp spring 96 is an example of an urging member such as a coil spring for urging the clamp shaft 82 upward. The clamp spring 96 is located between the unit case 68 and the clamp shaft 82. The clamp spring 96 can extend and contract in the up-down direction. An upper end portion of the clamp spring 96 urges the flange part 87 upward. A lower end portion of the clamp spring 96 is in contact with a portion of an inner wall of the unit case 68 in the up-down direction. Since the clamp spring 96 urges the flange part 87 upward, the upper portion of the columnar part 85 is held while protruding more upward than the guide part 72.

<Tool Shaft>

As illustrated in FIG. 7, the tool shaft 102 includes a bottom plate part 104, a grip part 105, a shaft body 106, and two pins 108. The bottom plate part 104, the grip part 105, the shaft body 106, and the two pins 108 are unified with one another. The tool shaft 102 is an example of a clamp part detachable to a lower portion of the clamp shaft 82. The tool shaft 102 urges the tip tool 16 from below when being attached to the clamp shaft 82.

The shaft body 106 is an example of a shaft part detachable to the clamp shaft 82. The shaft body 106 is a columnar section extending along the up-down direction. The shaft body 106 has an outer peripheral surface 106A as its side surface.

The bottom plate part 104 is an example of a contact part. The bottom plate part 104 protrudes in its radial direction from the outer peripheral surface 106A in a lower end portion of the shaft body 106. The bottom plate part 104 is a member that is contactable with the lower surface 18A of the tip tool 16. The bottom plate part 104 is formed in a circular disk shape having a predetermined thickness in the up-down direction. An upper surface 104A is formed in an upper end of the bottom plate part 104, and a lower surface 104B is formed in a lower end of the same.

The grip part 105 is a section that protrudes downward from the lower surface 104B. The grip part 105 extends along the radial direction of the bottom plate part 104, and can be gripped by the operator.

Each of the two pins 108 is formed in a columnar shape. From the outer peripheral surface 106A, the two pins 108 extend toward both outer sides of the shaft body 106, the outer sides being in the left-right direction. Note that the two pins 108 are symmetric to each other across the center of the shaft body 106. The pins 108 are insertable into the guide hole part 94.

When the grip part 105 is rotated around the axis K by the operator in a state in which the two pins 108 are inserted into the guide hole part 94 as illustrated in FIGS. 7 and 8, the two pins 108 are moved upward while being guided by the guide hole part 94, and are supported by the support hole 94B. As a result, the tool shaft 102 is connected to the clamp shaft 82. That is, since the two pins 108 engage with the clamp shaft 82, an urging force generated from the clamp spring 96 is transmitted to the tool shaft 102.

As illustrated in FIG. 4, the attachment ring 76 and the tool shaft 102 fix the tip tool 16 to the unit case 68 when sandwiching the tip tool 16 in the up-down direction.

<Clamp Lever>

Figure 10:
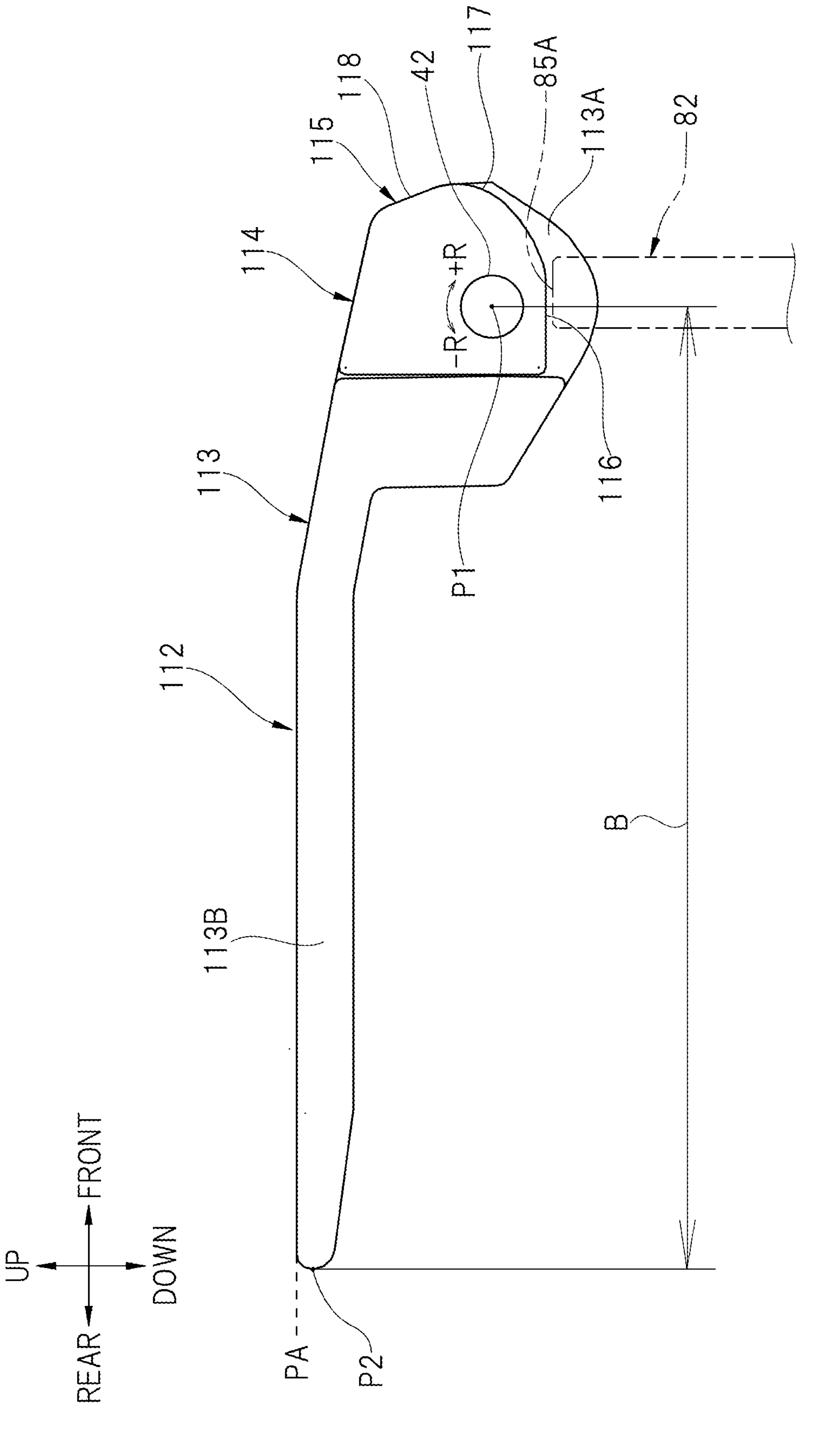
FIG. 10 is an explanatory diagram illustrating an outer peripheral portion of a push-piece.

As illustrated in FIG. 10, the clamp lever 112 is an example of a lever to be operated by the operator. The clamp lever 112 is rotatable around the support shaft 42. The clamp lever 112 moves the clamp shaft 82 in the up-down direction when being operated to rotate between a first position PA and a second position PB (FIG. 4) in its rotational direction.

The first position PA means a position in the rotational direction of the clamp lever 112 when the tip tool 16 is fixed (held) by the tool shaft 102 or the like.

The second position PB means a position of the clamp lever 112 in the rotational direction provided when the clamp lever 112 is rotated (stands straight) from the first position PA while a holding state of the tip tool 16 is released.

Specifically, the clamp lever 112 includes a lever body 113 and the push-piece 114 provided in the lever body 113. The lever body 113 includes a pair of base end parts 113A located to be spaced apart from each other in the left-right direction and a grip part 113B extending rearward from the pair of base end parts 113A. The push-piece 114 is fixed between the pair of base end parts 113A. The support shaft 42 penetrates the push-piece 114 and the pair of base end parts 113A in the left-right direction. In other words, the clamp lever 112 is rotatably connected to the support wall 39 (FIG. 3) while taking the support shaft 42 as its center axis.

The grip part 113B is exposed to the outside of the outer housing 22 through the upper opening 24 (FIG. 3). As a result, the operator can operate the clamp lever 112. The grip part 113B is operated to rotate around the support shaft 42 when being gripped by the operator.

In the following description, for the rotational operation of the clamp lever 112, an operation for rotating the grip part 113B forward is referred to as a "release operation", and an operation for rotating the grip part 113B rearward is referred to as an "attachment operation". For the rotational direction of the clamp lever 112, the rotational direction provided when the grip part 113B moves forward is set as a "+R" direction, and the rotational direction provided when the grip part 113B moves rearward is set as a "−R" direction.

When the clamp lever 112 is rotated from the first position PA to the second position PB, the attachment ring 76 and the tool shaft 102 are spaced apart from each other in the up-down direction by downward movement of the clamp shaft 82 with respect to the unit case 68.

(Push-Piece)

The push-piece 114 is an example of a cam part that presses the clamp shaft 82 downward. A posture of the push-piece 114 changes in accordance with the rotation of the clamp lever 112. The push-piece 114 is a block-shaped member made of a metal.

The push-piece 114 is located to be contactable with the clamp shaft 82 in the up-down direction. Specifically, the push-piece 114 is located to be contactable with or separable from the upper end surface 85A of the clamp shaft 82. A contact position of the push-piece 114 with the upper end surface 85A changes in accordance with the rotation of the clamp lever 112. The push-piece 114 includes an outer peripheral part 115 as viewed in the left-right direction that is the axial direction of the support shaft 42.

The outer peripheral part 115 is contactable with the upper end surface 85A. The outer peripheral part 115 includes a first flat surface 116, a curved surface 117, and a second flat surface 118. Note that the +R direction described above corresponds to a rotational direction of the push-piece 114 provided when the tip tool 16 (FIG. 1) is detached. The −R direction corresponds to a rotational direction of the push-piece 114 provided when the tip tool 16 is attached.

A center position P1 of a circle of the support shaft 42 is indicated by a point P1. The shortest distance from the center position P1 to the first flat surface 116 is shorter than the shortest distance from the center position P1 to the second flat surface 118. A distance from the center position P1 to the curved surface 117 continuously increases from a start point to an end point of the curved surface 117 in the −R direction. The curved surface 117 is an example of a circular arc portion that can press the clamp shaft 82.

A position P2 of a rear end of the grip part 113B is indicated by a point P2. The position P2 is an example of a tip position of the clamp lever 112. A length from the position P2 to the center position P1 in the front-rear direction is defined as a lever length B (mm). The lever length B is an example of a lever length from the center position of the support shaft to the tip position of the lever. Note that the lever length B is not a distance between the point P1 and the point P2.

<Operation Load Rate>

FIG. 11 illustrates a table of compilation of respective values of an operation load rate "Q" and an operation load "F" for a tool M1 to a tool M5 each obtained by changing respective item values of the electric-powered tool 10 according to the present embodiment and a tool M6 to a tool M9 that are comparative examples. Note that FIG. 1 to FIG. 9 are referred to for each of components in the electric-powered tool 10, and description of individual reference numbers will be omitted. The operation load rate Q corresponds to the characteristic value Q.

An item "A" is a spring load that acts on the clamp spring 96 when the clamp lever 112 is located at the first position PA described above. The spring load is represented by A (N). The spring load A is an example of the urging force. An item "B" is the lever length B (mm) described above. An item "C" is a lever operation angle "0" (FIG. 4) from the first position PA to the second position PB of the clamp lever 112. The lever operation angle θ (degree) is equivalent to the turning angle C (degree).

An item "D" is a stroke of the clamp shaft 82 in the up-down direction provided when the clamp lever 112 is rotated (turned) from the first position PA to the second position PB described above, and is a movement amount D (mm). An item "E" is a distance (mm) from a shaft center (a center position P1) of the support shaft 42 to the upper end surface 85A provided when the clamp lever 112 is located at the second position PB. An item "F" is a circular arc length (mm) of the cam, and is a circular arc length of the curved surface 117 of the push-piece 114. An item "G" is a radius of curvature (mm) of the cam, and is a radius of curvature of the curved surface 117.

An item "H" is an oscillation angle (degree) provided when the tip tool 16 oscillates. An item "I" is a number of revolutions, i.e., an oscillation frequency ($min^{-1}$) with no load acting on the tip tool 16. An item "J" is a total length (mm) of the electric-powered tool 10 in the front-rear direction. An item "K" is a mass (kg) of the entire electric-powered tool 10. An operation load "F" is an actually measured value, and is an operation load (N) required for the attachment of the tip tool 16.

As a result of studying a relationship in value between the operation load F and the item A to the item K, a correlation between the operation load rate Q (N/degree) and the operation load F has been found. The operation load rate Q is a characteristic value obtained by an expression "$Q=(A\times D)/(B\times C)\times 100$" using the respective values of the item A to the item D.

Figure 12:
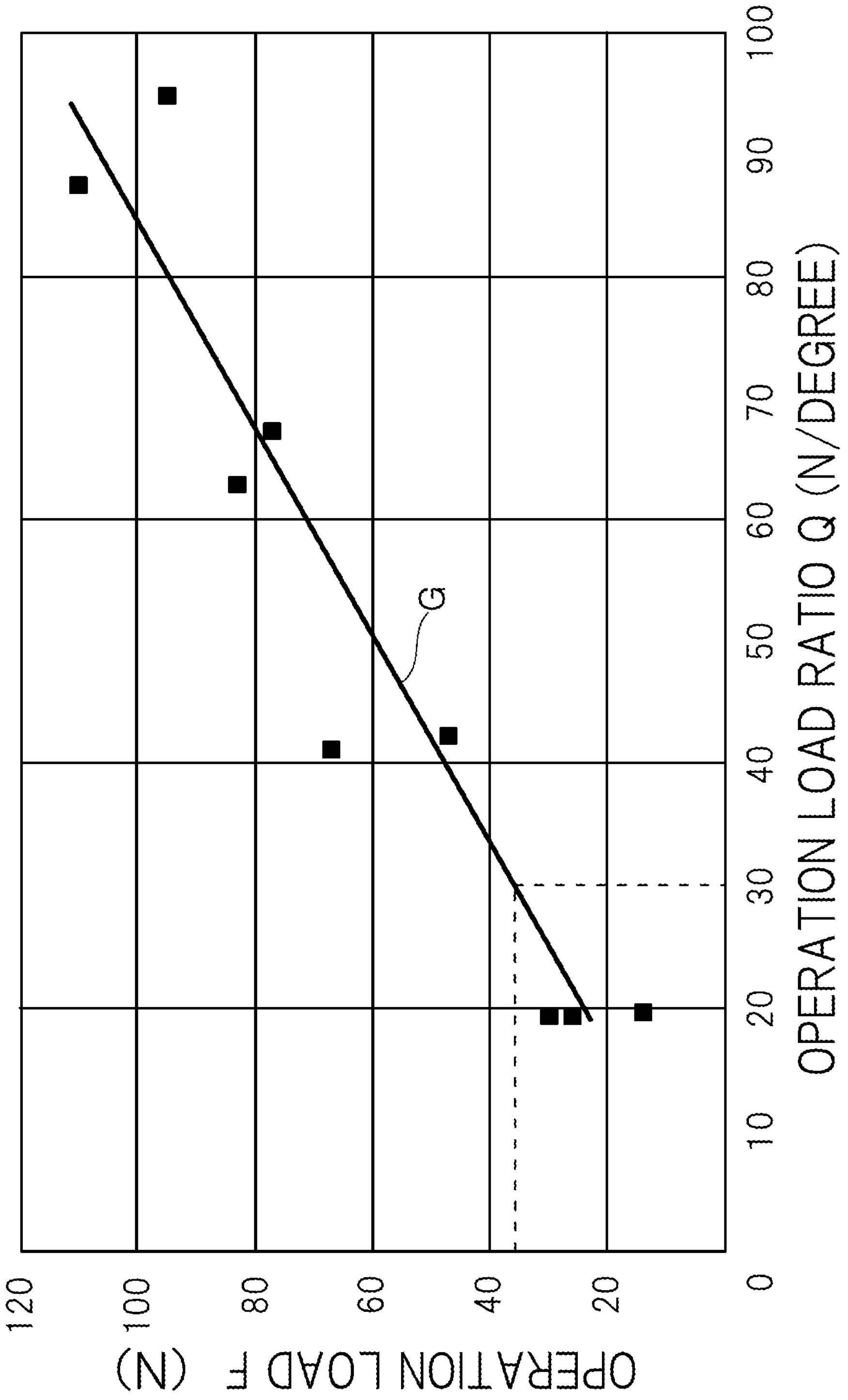
FIG. 12 is a graph illustrating a relationship between the operation load rate and the operation load illustrated in FIG. 11.

As a graph G, FIG. 12 illustrates a relationship between the operation load rate Q and the operation load F. From the graph G, it has been found that the operation load rate Q and the operation load F are in a substantially proportional relationship. That is, it has been found that the operation load on the clamp lever 112 can be suppressed to be small by setting the respective values of the items A, B, C, and D such that the operation load rate Q is small. Specifically, it has been found that the operation load F is equal to or smaller than 40 (N) when the operation load rate Q is equal to or smaller than 30 (N/degree). Accordingly, the operation load rate Q is preferably smaller than 30 (N/degree). If the clamp lever 112 easily moves, the operability may be even more damaged, and even the too long clamp lever 112 may create problems in operability. That is, the too small operation load rate Q may damage the operability. Therefore, in the present invention, the operation load rate Q may be preferably in a range of 5 to 50 (N/degree). Note that the operation load rate Q may be more preferably in a range of 10 to 30 (N/degree). Further, the operation load rate Q may be still more preferably in a range of 20 to 25 (N/degree).

In the electric-powered tool 10, the clamp lever 112 is provided to be rotatable from the first position PA to the second position PB described above by a load that is, for example, equal to or smaller than 50 (N). An urging force of the clamp spring 96 against the clamp shaft 82 provided when the clamp lever 112 is located at the first position PA is preferably, for example, equal to or smaller than 500 (N). The lever length B of the clamp lever 112 is preferably, for example, smaller than 70 (mm).

In the electric-powered tool 10, for the clamp lever 112, the turning angle C is preferably equal to or larger than 100 (degree). When the clamp lever 112 is operated from the first position PA to the second position PB, the movement amount of the tool shaft 102 in the up-down direction is preferably equal to or larger than 3.5 (mm). When the clamp lever 112 is located at the first position PA, a distance between the push-piece 114 (the outer peripheral part 115) and the clamp shaft 82 (the upper end surface 85A) in the up-down direction is preferably larger than 0 (mm) and smaller than 5 (mm). The radius of curvature of the curved surface 117 of the push-piece 114 is preferably smaller than 6 (mm).

Function and Effect of Present Embodiment

Figure 13:
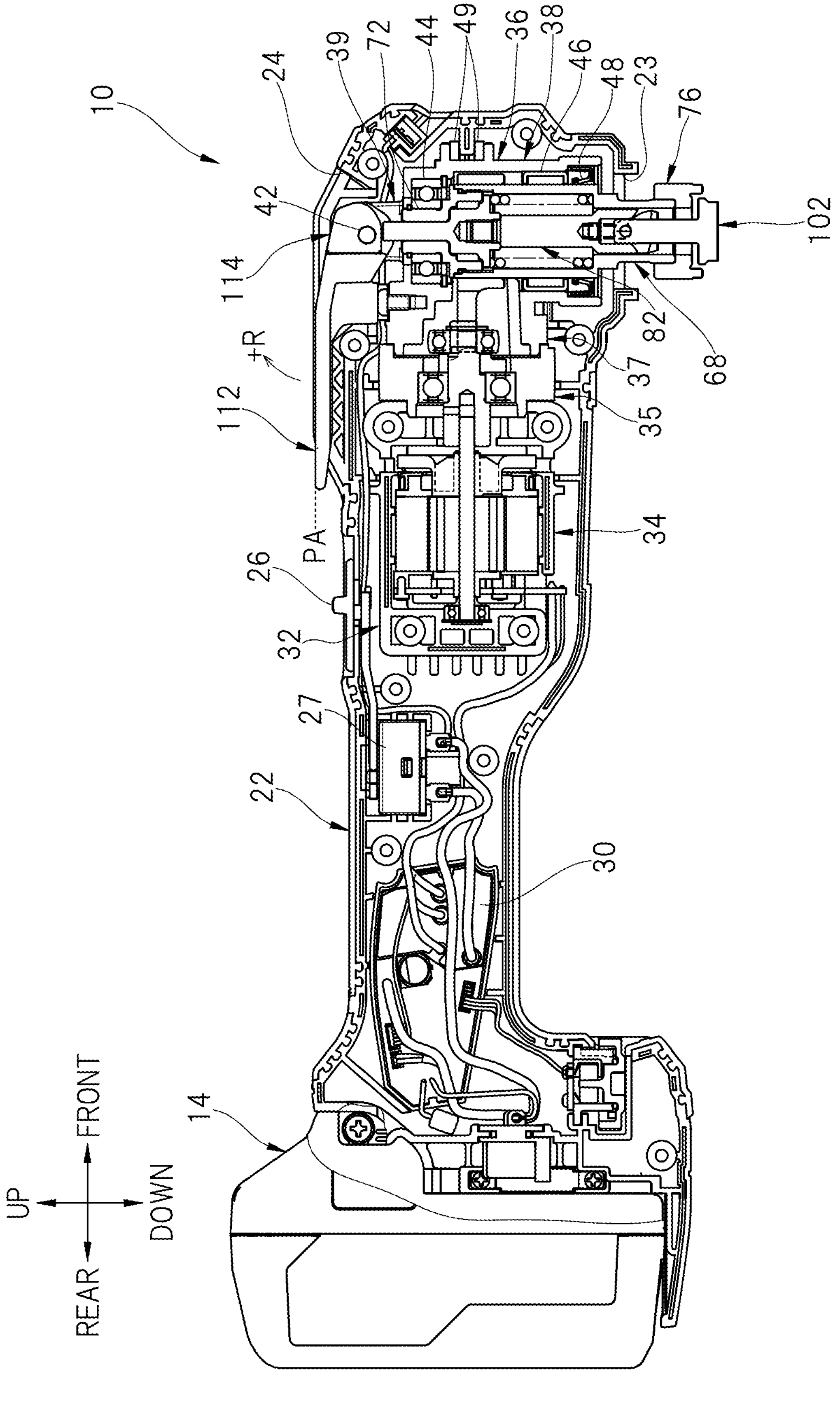
FIG. 13 is a cross-sectional view illustrating an internal structure of the electric-powered tool in a state before attachment of the tip tool.

FIG. 13 illustrates the electric-powered tool 10 to which the tip tool 16 (FIG. 1) is not attached. The clamp lever 112 is located at the first position PA. When the clamp lever 112 is turned in the +R direction by the operator, the push-piece 114 and the clamp shaft 82 are made in contact with each other, and therefore, the clamp shaft 82 moves downward.

Figure 14:
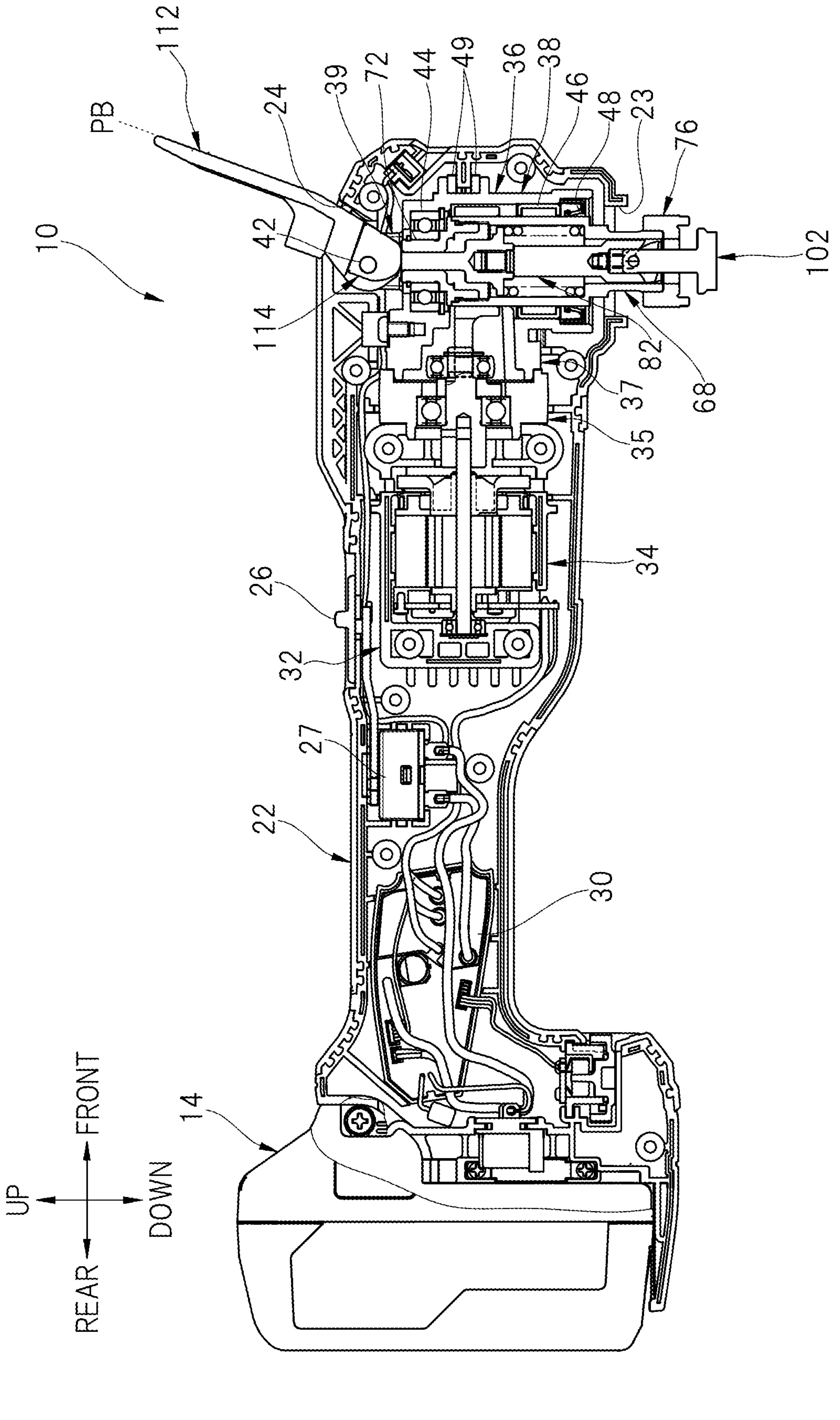
FIG. 14 is a cross-sectional view illustrating an internal structure of the electric-powered tool in a state where the clamp lever is operated in a release direction.

As illustrated in FIG. 14, when the clamp lever 112 is located at the second position PB, the tool shaft 102 protrudes downward from the attachment ring 76. The tool shaft 102 is detached from the clamp shaft 82 when being rotated by the operator.

As illustrated in FIG. 8, the shaft body 106 is inserted into the hole part 19 (FIG. 2) of the tip tool 16. As a result, the attachment part 18 is attached to the bottom plate part 104. The pin 108 is arranged to face a lower end of the guide hole part 94. When the tool shaft 102 is lifted upward by the operator, the pin 108 moves along the guide hole part 94, and the tool shaft 102 and the clamp shaft 82 are connected to each other. Posture of the tip tool 16 is adjusted in a state in which the tool shaft 102 and the clamp shaft 82 are connected to each other.

As illustrated in FIGS. 1 and 4, the clamp lever 112 moves from the second position PB to the first position PA when being turned in the −R direction. At this time, the clamp shaft 82 and the tool shaft 102 are lifted by the urging force of the clamp spring 96. As illustrated in FIG. 6, when the protrusion 79 is inserted into the through hole 21, the tip tool 16 is fixed.

In the electric-powered tool 10, the spring load A, the lever length B, the turning angle C, and the movement amount D are set such that the operation load rate Q is smaller than 30 (N/degree). As a result, the operation load F on the clamp lever 112 can be made smaller than 40 (N), and therefore, the operability at the time of replacement of the tip tool 16 can be improved.

The electric-powered tool 10 includes the shaft body 106, and therefore, can securely has a length connectable to the clamp shaft 82, and can support the tip tool 16 by using the bottom plate part 104.

When the tool shaft 102 is moved upward, the pin 108 is moved along the guide hole part 94 (the clamp shaft 82) and engages with the support hole 94B, and therefore, the urging force of the clamp spring 96 is transmitted to the tool shaft 102. When the tool shaft 102 is moved upward as described above, the tool shaft 102 and the clamp shaft 82 are connected to each other, and therefore, a work for screwing the tool shaft 102 is unnecessary, and the attachment/detachment operation for the tip tool 16 can be easily performed.

The attachment ring 76 includes the hole part 77C and the plurality of protrusions 79. A direction in which the shaft body 106 is inserted into the hole part 77C is the up-down direction that is an axial direction of the clamp shaft 82. Accordingly, when the tool shaft 102 is attached to the clamp shaft 82 while being along the up-down direction, the attachment ring 76 does not interfere with this work. Since the plurality of protrusions 79 respectively engage with the plurality of through holes 21 of the tip tool 16, the tip tool 16 can be prevented from shifting in position in the swing (oscillation) direction.

The tapered surface 79A engages with the through hole 21 on one side in the swing direction while the tapered surface 79B engages with the through hole 21 on the other side, and therefore, the tip tool 16 can be prevented from shifting in position on both the one side and the other side in the swing direction. Further, since the tapered surface 79A and the tapered surface 79B are in contact with the through hole 21 at two portions being symmetric with each other across the reference line M, their respective contact positions are suppressed from shifting in the up-down direction, and therefore, inclination of the tip tool 16 from a horizontal surface can be prevented.

Modification Example of Present Embodiment

It goes without saying that the present invention is not limited to the above-described embodiments, and various modifications can be made within the scope of the invention.

For the electric-powered tool 10, the tool shaft 102 is not limited to the unified form of the bottom plate part 104 and the shaft body 106, and the bottom plate part 104 and the shaft body 106 may be respectively configured as separate members. The engagement between the clamp shaft 82 and the tool shaft 102 is not limitedly achieved by the pin 108, and may be achieved by a screw-type form using a male screw and a female screw.

The engagement between the attachment ring 76 and the tip tool 16 is not limited to the engagement between the plurality of protrusions 79 and the plurality of through holes 21, and may be engagement between a protrusion and a groove. The protrusion 79 is not limited to have the tapered surfaces 79A and 79B, and may have a curved surface or a surface extending along the up-down direction. The number of tapered surfaces of the protrusion 79 is not limited to two, and may be one or three, or more. Further, the number of portions where the protrusion 79 and the through hole 21 engage with (contact) each other may be one or three, or more. The tapered surface 79A and the tapered surface 79B do not need to be symmetric with each other across the reference line M.

The clamp lever 112 may be provided to be rotatable from the first position PA to the second position PB by a load that is larger than 50 (N). The urging force of the clamp spring 96 against the clamp shaft 82 provided when the clamp lever 112 is located at the first position PA may be larger than 500 (N). The lever length B of the clamp lever 112 may be equal to or larger than 70 (mm).

For the clamp lever 112, the turning angle C may be smaller than 100 (degree). When the clamp lever 112 is operated from the first position PA to the second position PB, the movement amount of the tool shaft 102 in the up-down direction may be smaller than 3.5 (mm).

When the clamp lever 112 is located at the first position PA, the distance between the push-piece 114 and the clamp shaft 82 in the up-down direction may be equal to or larger than 5 (mm). The radius of curvature of the curved surface 117 may be equal to or larger than 6 (mm).

What is claimed is:

1. A working machine comprising:

a motor;

an output part oscillating around an axis extending along an up-down direction when receiving a rotational force of the motor;

a tool holding part provided on the output part for holding a tip tool;

a clamp shaft supported by the output part;

an urging member urging the clamp shaft upward;

a clamp part detachably provided to a lower portion of the clamp shaft, the clamp part urging the tip tool from below when being the clamp part is attached to the clamp shaft; and a lever rotatable around a support shaft, the lever moving the clamp shaft in the up-down direction when operated between a first position and a second position in a rotational direction, wherein the tool holding part and the clamp part fix the tip tool to the output part by sandwiching the tip tool therebetween, the lever moves the clamp shaft downward relative to the output part to separate the tool holding part and the clamp part from each other in the up-down direction when the lever is rotated from the first position to the second position, and a characteristic value "Q" defined by $Q=(A \times D)/(B \times C) \times 100$ is not less than 5 N/degree and not greater than 50 N/degree, where A represents an urging force of the urging member, expressed in newtons, provided when the lever is located at the first position, B represents a lever length, expressed in millimeters, from a center position of the support shaft to a tip position of the lever in an intersection direction intersecting the up-down direction, C represents a turning angle, expressed in degrees, of the lever from the first position to the second position of the lever, and D represents a movement amount, expressed in millimeters, of the clamp shaft provided when the lever is rotated from the first position to the second position.

2. The working machine according to claim 1, wherein the clamp part includes:

a shaft part being attachable/detachable to/from the clamp shaft; and a contact part protruding from an outer peripheral surface of the shaft part and being in contact with a lower surface of the tip tool.

3. The working machine according to claim 2,
wherein the clamp part includes a pin extending from the outer peripheral surface of the shaft part in a width direction intersecting both the up-down direction and the intersection direction, and
the urging force of the urging member is transmitted to the clamp part when the pin engages with the clamp shaft.

4. The working machine according to claim 2,
wherein a plurality of hole parts arranged in a swing direction of the output part are formed in the tip tool, and
the tool holding part includes:
an insertion hole into which the shaft part is inserted; and
a plurality of protrusions being located to surround the insertion hole when viewed from below in the up-down direction and engaging with the plurality of hole parts when the tip tool is attached.

5. The working machine according to claim 4,
wherein each of the protrusions includes a tapered part being in contact with the hole part at least at two portions of the hole part.

6. The working machine according to claim 5,
wherein the protrusion protrudes downward from the tool holding part, and,
when a virtual line passing through a center of the protrusion in the swing direction and extending along the up-down direction is regarded as a reference line,
the two portions are symmetric to each other across the reference line.

7. The working machine according to claim 5,
wherein the lever is provided to be rotatable from the first position to the second position by a load that is equal to or smaller than 50 N.

8. The working machine according to claim 5,
wherein the urging member is a coil spring, and
the urging force of the urging member provided when the lever is located at the first position is equal to or smaller than 500 N.

9. The working machine according to claim 1,
wherein the lever length (B) is smaller than 70 mm.

10. The working machine according to claim 1,
wherein the turning angle (C) of the lever is equal to or larger than 100 degree.

11. The working machine according to claim 1,
wherein a movement amount of the clamp part in the up-down direction provided when the lever is operated from the first position to the second position is equal to or larger than 3.5 mm.

12. The working machine according to claim 1,
wherein the lever includes a cam part being in contact with the clamp shaft in the up-down direction and pressing the clamp shaft downward, and
a distance between the cam part and the clamp shaft in the up-down direction provided when the lever is located at the first position is larger than 0 mm and smaller than 5 mm.

13. The working machine according to claim 12, wherein the cam part has a circular arc portion being capable of pressing the clamp shaft, and
a radius of curvature of the circular arc portion is smaller than 6 mm.

14. The working machine according to claim 1,
wherein the characteristic value Q is not less than 10 N/degree and not greater than 30 N/degree.

15. The working machine according to claim 14,
wherein the characteristic value Q is not less than 20 N/degree and not greater than 25 N/degree.

* * * * *